United States Patent
Skellenger et al.

(10) Patent No.: US 10,773,749 B2
(45) Date of Patent: Sep. 15, 2020

(54) DRIVER WARNING IN ELECTRIC POWER STEERING SYSTEMS

(71) Applicant: STEERING SOLUTIONS IP HOLDING CORPORATION, Saginaw, MI (US)

(72) Inventors: Dennis B. Skellenger, Saginaw, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 422 days.

(21) Appl. No.: 15/785,917

(22) Filed: Oct. 17, 2017

(65) Prior Publication Data

US 2019/0111968 A1 Apr. 18, 2019

(51) Int. Cl.
*B62D 6/00* (2006.01)
*B62D 5/04* (2006.01)

(52) U.S. Cl.
CPC .......... *B62D 6/008* (2013.01); *B62D 5/0463* (2013.01); *B62D 5/0481* (2013.01); *B62D 5/0484* (2013.01)

(58) Field of Classification Search
None
See application file for complete search history.

(56) References Cited

U.S. PATENT DOCUMENTS

2002/0019690 A1* 2/2002 Kurishige ............ B62D 5/0466
701/41

* cited by examiner

*Primary Examiner* — John Olszewski
*Assistant Examiner* — Gerrad A Foster
(74) *Attorney, Agent, or Firm* — Dickinson Wright PLLC (57) ABSTRACT

Technical solutions are described for providing driver warning using steering systems. An example steering system includes a motor control system that sends a command to a motor. The steering system further includes a fault monitoring system that sets a fault indication flag by monitoring one or more components of the steering system. The steering system further includes a driver warning feedback system that generates a warning injection signal based on and in response to the fault indication flag being set. Further, the motor control system generates a driver feedback by modifying the command to the motor using the warning injection signal, and sending the modified command to the motor.

20 Claims, 4 Drawing Sheets

DRIVER WARNING IN ELECTRIC POWER STEERING SYSTEMS

BACKGROUND

The present application generally relates to electric power steering systems (EPS), and particularly to providing driver warnings via the EPS.

Safety requirements in a contemporary EPS require advanced failure monitoring, including both prognostics and diagnostics, for ensuring safe operation of both the hardware and software components of the EPS. With improved diagnostics, there is an increasing need for providing warning when the EPS is approaching a failure condition, or once the failure has occurred. With the inclusion of fault tolerant control in a modern EPS, typical ways of alerting the driver that have been developed, include reducing the assist provided by the EPS so that the EPS feels heavy to a driver and the driver is, to an extent, is cautioned to take the EPS for repair. Accordingly, it is desirable to provide an active driver warning system for indicating a diagnostic or prognostic condition in an EPS.

SUMMARY

One or more embodiments are described for providing driver warning using steering systems. An example steering system includes a motor control system that sends a command to a motor. The steering system further includes a fault monitoring system that sets a fault indication flag by monitoring one or more components of the steering system. The steering system further includes a driver warning feedback system that generates a warning injection signal based on and in response to the fault indication flag being set. Further, the motor control system generates a driver feedback by modifying the command to the motor using the warning injection signal, and sending the modified command to the motor.

An example method for providing driver warning feedback using a motor control loop in a steering system includes generating a command to be sent to a motor for generating torque. The method further includes receiving an indication flag that is indicative of a fault in one or more components of the steering system. The method further includes generating a warning injection signal based on and in response to the fault indication flag being set. The method further includes generating a driver feedback by modifying the command with the warning injection signal, and sending the modified command to the motor.

Further, according to one or more embodiments, a driver warning feedback system includes a fault monitoring and arbitration module that monitors a fault indication flag that is indicative of a fault in operation of one or more components of a steering system, and determines a type of driver feedback to provide in response to the fault indication flag being set. The driver warning feedback system further includes an injection signal calculation module that computes a warning injection signal based on the type of the driver feedback to be provided, the computation including determining a frequency, phase, and amplitude of the warning injection signal. The injection signal calculation module further sends the warning injection signal to a motor control system of the steering system for superimposing the warning injection signal on a command sent to a motor of the steering system to generate the driver feedback.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
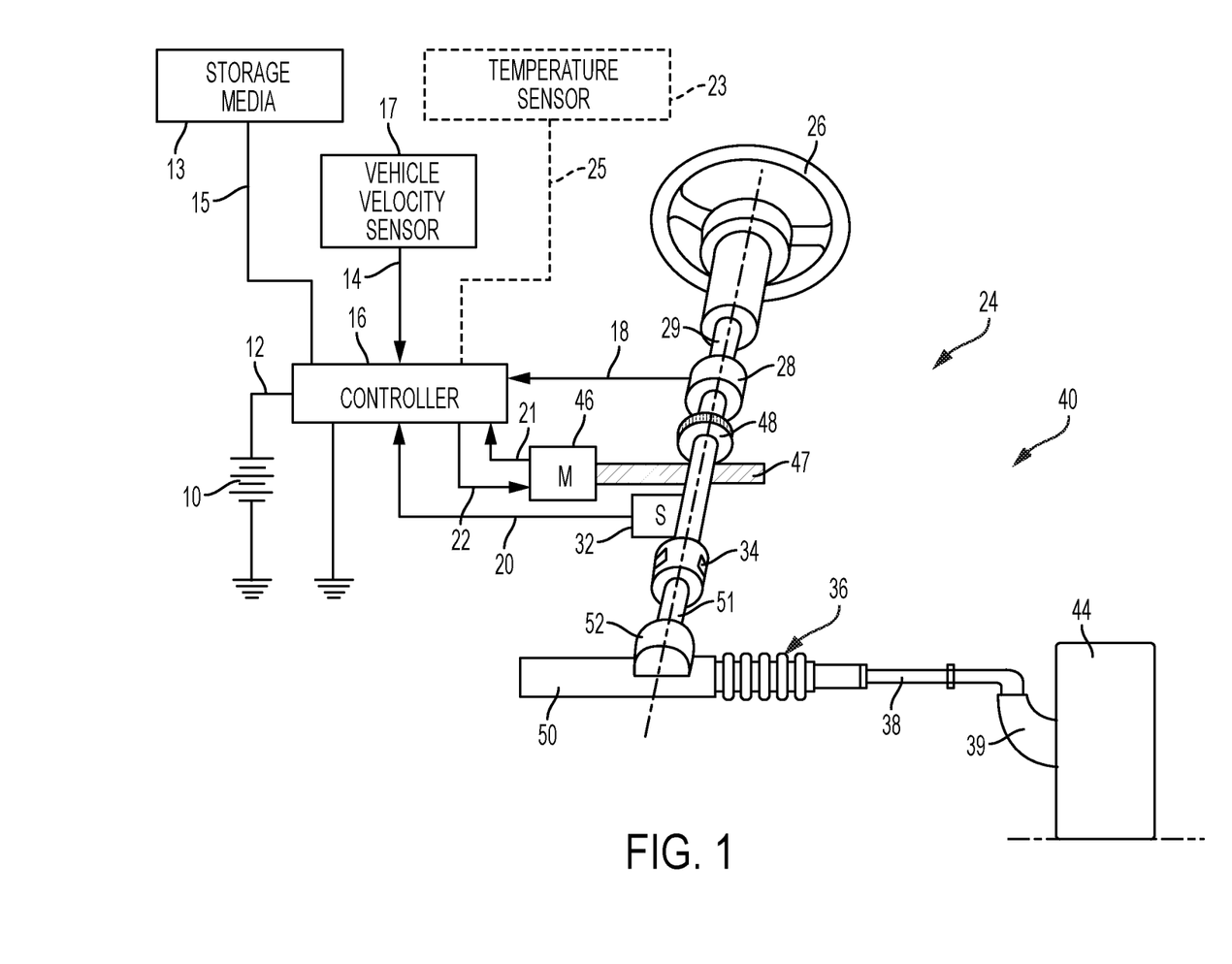
FIG. 1 depicts an EPS system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46, which could be a permanent magnet synchronous motor, a permanent magnet direct current motor, a switched reluctance motor, or any other type of motor, are is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown), which may optionally be incorporated with controller 16 and will be referred to herein as controller 16, such that, when applied to the motor 46, the desired torque or position is generated. Because these voltages are related to the position and speed of the motor 46 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

In one or more examples, the technical solutions described herein facilitate the use of the electric drive portion of the EPS system, and more specifically, the motor control loop (including the current (torque) control system and the electric motor and various sensors), to provide warning to the driver when a failure is either about to occur (prognostics) or has already occurred (diagnostic) and the EPS 40 is still in operation. The warning may be provided through feedback to the driver in different ways, including tactile feedback, acoustic feedback, and the like or a combination thereof. Further, because fail-safe conditions may potentially last over periods of time (for instance, when the driver decided to keep operating even with reduced assist for durations above predetermined thresholds), which may be within one ignition cycle or over multiple cycles, the technical solutions described herein facilitate implementing a time-varying warning mechanism is also described, where the amount of warning feedback is varied over time. The warning system according to the technical solutions described herein may be implemented in an identical manner irrespective of the configuration of the motor control system (i.e., feedback or feedforward control). The technical solutions described herein thus address the technical challenge of providing an active feedback to a driver using an EPS to indicate a diagnostic and/or a prognostic condition with the EPS. The technical solutions described herein thus facilitate an improvement to a typical EPS by providing such an active feedback notification system.

Figure 2:
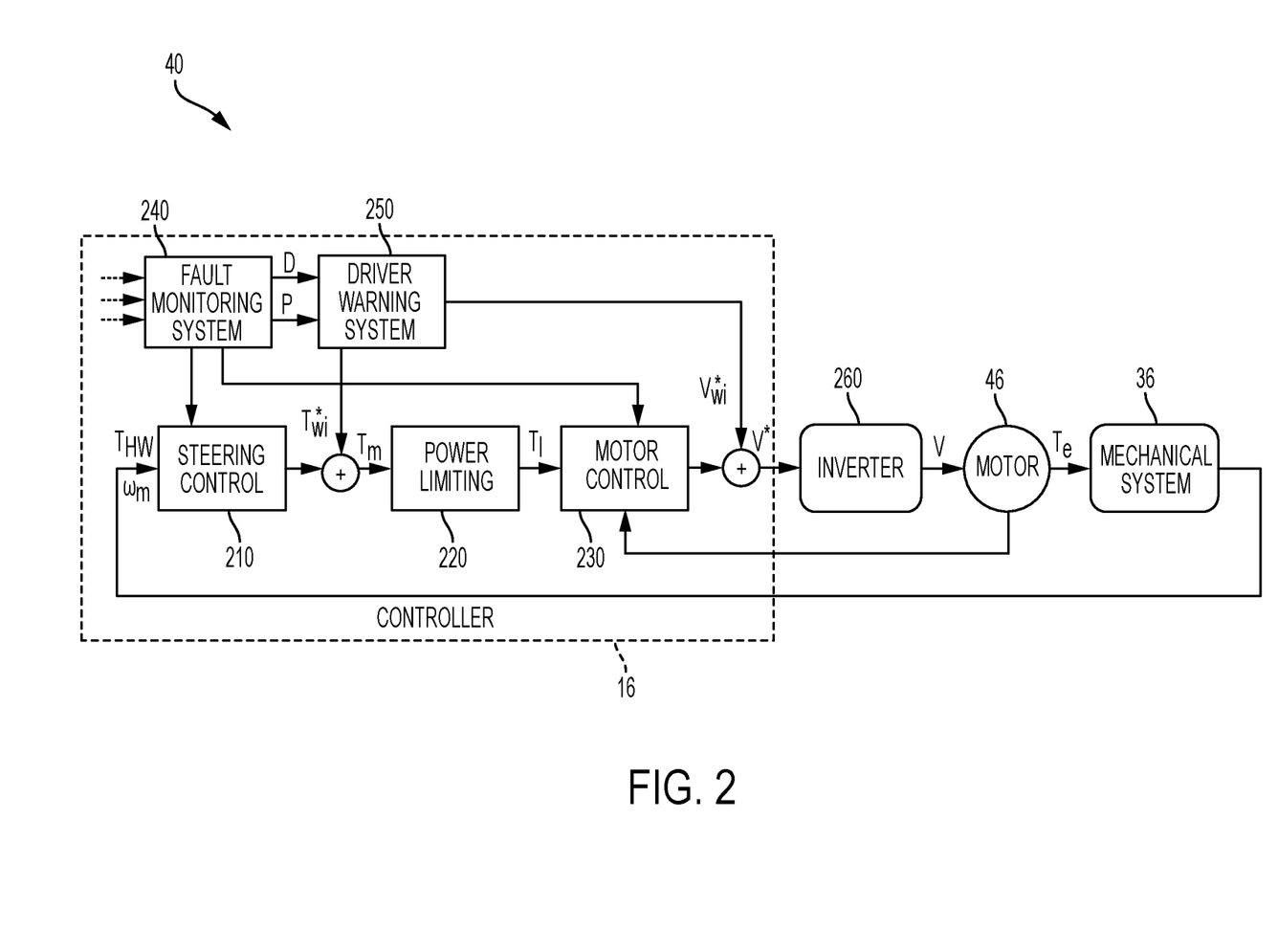
FIG. 2 depicts a block diagram of the EPS system with an example driver warning module according to one or more embodiments.

FIG. 2 depicts a block diagram of the EPS according to one or more embodiments. The controller 16 of the EPS 40 includes a steering control module 210 that generates a motor torque command based on one or more control signals, such as the handwheel torque and motor velocity, among others. The steering control may use any algorithm to determine the torque command. In one or more examples, the controller 16 further includes a power limiting module 220 that modifies the motor torque command based on predetermined limits, which may be configurable. In one or more examples, the predetermined limits are computed by the controller 16 in real time; alternatively, the predetermined limits are preconfigured values. The modified torque command is provided as an input torque command to a motor control system 230.

The motor control system 230, upon receipt of the input torque command generates the corresponding voltage commands to be send to the inverter 260 such that the inverter 260 applies a voltage to the motor 46 to generate the desired torque (Te). The generated torque is applied to the mechanical system 36, for example, to maneuver the wheel 44. In one or more examples, the torque generated includes the assist torque that boosts the handwheel torque applied by the driver at the driver input 26.

In addition, the controller 16 includes a fault monitoring system 240 that monitors the one or more components of the EPS 40, including the hardware and software components. For example, the fault monitoring system 240 monitors the mechanical components, for example using one or more sensors, and compares the one or more sensor values with estimated values that are computed using an electromechanical model of the EPS 40. If the measured values exceed the estimated value by predetermined thresholds, the fault monitoring system 240 deems that a failure condition has occurred (diagnostic) or is about to occur (prognostic).

In one or more examples, the fault monitoring system 240 generates flags indicating either a failure that is about to occur, referred to as a Prognostics Flag P hereafter, or the occurrence of a failure, referred to as a Diagnostics Flag D. The flags may be binary values, such as software flags. Further, in one or more examples, the fault monitoring system 240 monitors multiple components in the EPS 40, and hence P and D may be matrix values indicating the status of the multiple components. The technical solutions described herein facilitate providing warning/feedback to the driver, irrespective of which specific component causes failure flag(s) to be set, and/or how the fault monitoring system 240 detects the failure condition.

Typically, in response to one of the P and D flags from the fault monitoring system being set, the controller 16 either causes the EPS 40 to shutdown, which could include disconnecting the voltage source, turning off the gate drive (and thus the inverter) and disabling various functions within the EPS 40 (such as software components), or modifying the system behavior of the EPS 40 by changing specific functions or tuning. For instance, when the system behavior is to be changed, say for a current sensor failure, the monitoring system 240 initiates a torque command modification and transitions the motor control system 230 to feedforward control mode from a feedback control mode.

The technical solutions described herein, in addition to the system behavior modification(s), facilitate signal injection(s) and command modification(s) to provide driver warning feedback. In one or more examples, the injected signal is superimposed on the base signals as calculated by the one or more components of the controller 16. The base signals and commands are the control signals and the commands, such as the torque command, the current command, and the voltage command that are generated by the one or more components of the controller 16. In one or more examples, the base commands may be replaced by the warning injection signals.

For example, as depicted in FIG. 2, the controller includes a driver warning system 250 that receives the flags D and P from the fault monitoring system 240 and generates the signal injections and/or command modifications.

Figure 3:
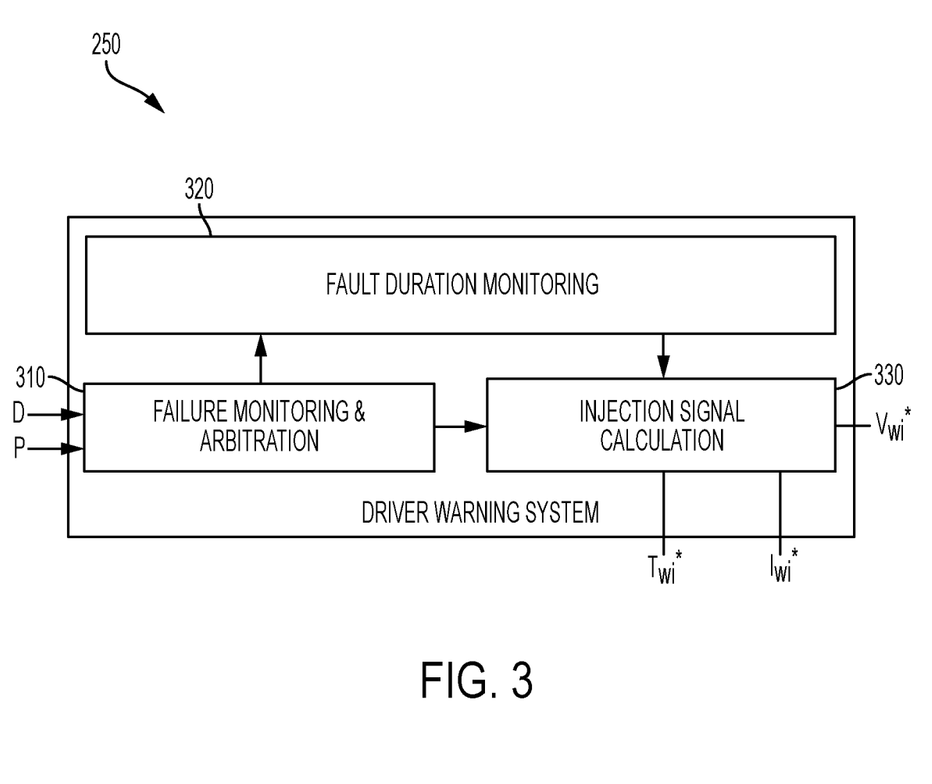
FIG. 3 depicts a block diagram of a portion of an example driver warning system according to one or more embodiments.

FIG. 3 depicts a block diagram of an example driver warning system according to one or more embodiments. The driver warning system 250, as depicted, includes a failure monitoring and arbitration (FMA) module 310, an injection signal calculation module 330, and a fault duration monitoring module 340, among other components.

The FMA module 310 evaluates the type of flags set by the fault monitoring system 240 and determines the warning signal(s) that are to be injected for the driver. By determining the warning signal(s) the FMA module 310 determines the type of warning feedback generated for the driver. The driver warning feedback may be tactile, acoustic, or a combination of both. Further, the driver warning feedback may be determined based on a specific signature of a fault that is detected by the fault monitoring system 240. For example, the signature may be a state of the diagnostic and prognostic flag(s) of the fault monitoring system 240. Alternatively, or in addition, the fault monitoring system 240 sends the signature as a separate signal to the FMA module 310, for example, upon a request from the FMA module 310.

Based on the type of the warning feedback to be generated, the injection signal calculation module 330 computes the injection signal and sends it to the corresponding module/location in the controller 16. The injection signal calculation module 330 receives different control signals such as the position, motor velocity, vehicle speed, and the like, which are used to determine the different warning injection signals. For example, the injection signal calculation module 330 computes pulsating injection signals to modify the torque command, the current command, and/or the voltage command. The pulsating signals may be fixed frequency signals or be functions of position and (or) velocity, for example, a sinusoidal signal with a frequency equal to an integral multiple of the motor velocity. As another example, the sinusoidal signal may have a frequency equal to an integer times the position signal, i.e., a harmonic of the fundamental frequency of the motor.

For example, for the torque command signal injection, the injection signal calculation module 330 generates a warning-indication torque signal (T*) that has a fixed or varying (order based) frequency. In one or more examples, the injection signal calculation module 330 generates the warning-indication torque signal as a function of one or more control signals in the EPS 40, such as the motor velocity, vehicle speed, acceleration, bridge voltage etc.

Further, for the current command signal injection, the injection signal calculation module 330 generates a warning-indication current signal ($I_{wi}$*) that is a direct pulsating component injected in current commands.

Further yet, for the voltage command signal injection, the injection signal calculation module 330 generates a warning-indication voltage signal ($V_{wi}$*) that has a fixed or varying (order based) frequency. In one or more examples, the injection signal calculation module 330 generates the warning-indication voltage signal with a dithered frequency, which is a time varying frequency around a predetermined switching frequency of the control loop of the motor 26. Alternatively, or in addition, in one or more examples, the injection signal calculation module 330 generates the warning-indication voltage signal with a fixed frequency of the control loop.

Further, in one or more examples, the injection signal calculation module 330 generates multiple warning injection signals for multiple commands, for example, a combination of different signals, such as simultaneous torque and voltage injection signals. The different injection signals may be constant value signals or periodically varying signals generated using fixed or varying (order based) frequencies. In one or more examples, the combination of the injection signals are fed in a coordinated manner into the control loop to generate the driver warning feedback.

Further yet, in one or more examples, the injection signal calculation module 330 generates injection signals that simulate sensor errors, which cause the system behavior modification. For example, the sensor error injection signals include gain or offset errors in current, position, voltage, and/or temperature signals, or any other sensor signals used in the EPS 40, such as those that are used by the steering control 210, motor control 230, or any other component of the controller 16. In the case of a resolver type position sensor (sine-cosine sensor), a quadrature error between the sine and cosine signal could also be simulated. The injection signal calculation module 330, in other words, manipulates one or more sensor signals received by the controller 16 (or any other component) by calculation of a constant value or a pulsating signal to be injected in the sensor signal(s) to create a sensor error condition. In one or more examples, the error signal injection is performed as harmonic injection in the sensor signals.

The sensor signals may be modified in this manner, by injecting an erroneous pulsation in the sensor signals, in the case where the motor control loop rejects the warning injection signals for the current, torque, and/or voltage commands, as disturbances. For instance, voltage signals are disturbance signals for the motor control current loop, and when a high bandwidth feedback current control loop is employed, these signals may be rejected (in part) by the control loop. This is particularly the case for voltage signals at lower frequencies.

In one or more examples, the injected signals simulate error conditions in one or more hardware components (such as inverter or gate drives). In response to the simulated errors being introduced, and further being detected by the fault monitoring system 210, a driver warning feedback is generated. For instance, an error condition simulation may include setting one of the voltage outputs of the voltage command generation module to zero or to simulate a lower FET short of one of the phase legs of the inverter, and the like. Other error simulations are possible in other examples.

The warning signal(s) injected into the base commands causes the driver warning feedback to be tactile, acoustic, or a combination of both. The frequency of the pulsation used for the warning signal injection determines whether the warning feedback is tactile, acoustic or a combination. For example, the torque or current commands are used for generating tactile feedback because of the low bandwidth control loop implementation and control loop bandwidth limitations, for the torque and current commands. Alternatively, or in addition, voltage injection is used for acoustic feedback because relatively higher frequencies may be injected directly in the voltage commands, compared to torque and current commands. Further, the injection mechanisms, such as signal transmission paths in the EPS 40, may also partly lead to the use of one type of signal injection for generating the tactile and/or acoustic warning feedback.

Referring back to the FIG. 3, the fault duration module 330 determines the duration for which the fault is ongoing. For example, the fault duration module 330 keeps track, using a non-volatile memory save/restore feature, if the fault is ongoing across multiple ignition cycle, number of miles the fault has been ongoing, amount of time the EPS 40 has been operated with the ongoing fault, and other such attributes associated with the ongoing fault. The fault duration module 330 may further track a number of times a driver feedback has been provided regarding the ongoing fault. Accordingly, based on the tracked information, the fault duration module 330 modifies the injection signal amplitudes. Alternatively, or in addition, the fault duration module 330 modifies the injection signal to provide the injection signals in bursts, i.e., an intermittent injection.

Figure 4:
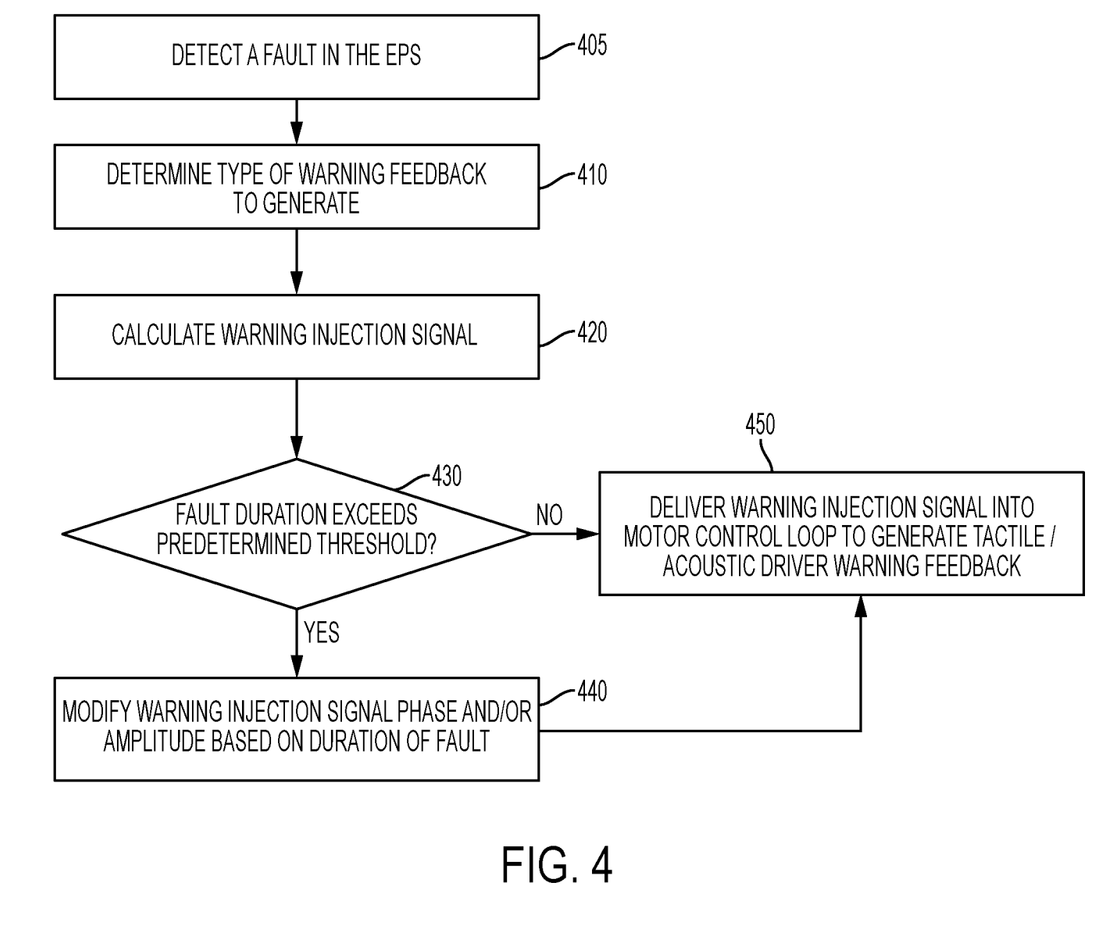
FIG. 4 illustrates a flowchart of an example method of providing a driver warning feedback according to one or more embodiments.

FIG. 4 illustrates a flowchart of an example method of providing a driver warning feedback according to one or more embodiments. The method includes detecting a fault condition with the EPS 40, as shown at block 405. The fault monitoring system 210 detects the fault condition, which may be a diagnostic or a prognostic condition. The fault monitoring system 210 accordingly sets a diagnostic and/or a prognostic flag. The driver warning system 250 monitors the fault condition flags and generates a driver warning feedback in response.

Generating the driver warning feedback includes the FMA module 310 determining a type of warning feedback to generate, as shown at block 410. For example, the FMA module 310 may determine the type of warning feedback to be a tactile feedback, an acoustic feedback, or a combination thereof. The type of warning feedback may be determined based on the type of flag that is set. Alternatively, or in addition, the type may be determined based on the type of fault condition.

Based on the driver warning feedback to be generated the injection calculation module 330 computes a warning injection signal, as shown at block 420. In one or more examples, the warning injection signal is a periodic signal. Computing the warning injection signal includes determining an amplitude, and frequency of the signal. For example, a warning injection signal for generating an acoustic driver warning feedback is different from warning injection signal for generating a torque driver warning feedback. In one or more examples, the injection signal calculation module 320 computes the amplitude, phase, and frequency based on one or more control signals of the EPS 40, such as motor velocity, handwheel velocity, motor position, vehicle speed, or any other control signal. In one or more examples, the warning injection signal may not be a periodic frequency, rather a constant signal with zero frequency.

Further yet, the method includes determining whether a duration of the fault condition exceeds a predetermined threshold, as shown at block 430. The predetermined threshold may be a configurable value, which may be computed at real time in one or more examples, for example based on additional fault conditions/changes in the EPS 40. If the predetermined threshold is not exceeded, the calculated warning injection signal is not modified, and the warning injection signal is sent to the motor control loop to generate tactile/acoustic driver warning feedback, as shown at block 450.

If the duration is exceeded, the fault duration monitoring module 330 adjusts the warning injection signal, as shown at block 440. For example, if the fault condition has existed over multiple ignition cycles, the intensity of the driver warning feedback is adjusted accordingly, for example, increased. The intensity is adjusted by adjusting the amplitude, phase, and/or frequency of the warning injection signal. For example, depending on a severity of the fault condition, which may be predetermined and accessible via a look up table, the frequency at which the driver warning feedback is provided is varied. Alternatively, or in addition, based on the severity, the amplitude is varied. Alternatively, or in addition, based on the severity, a phase is varied. In one or more examples, all three parameters, the amplitude, the frequency, and the phase, or a combination thereof is varied.

The modified warning injection signal is then delivered into the motor control loop to generate tactile/acoustic driver warning feedback, as shown at block 450. The delivery location of the warning injection signal is based on the type of command being modified. For example, if a torque command is being modified, the warning injection signal is injected to a blend module, such as an adder, that receives the torque command and superimposes the warning injection signal onto the base torque command. The modified torque command is then provided to the motor control system for generating a modified torque using the motor 26. Alternatively, or in addition, if the current command is being modified, the warning injection signal is superimposed by a blend module onto the current command, and the modified current command is then used for generating the torque. Alternatively, or in addition, the voltage command is modified by superimposing the warning injection signal and the thus modified voltage command is used by the motor control system to generate a corresponding torque from the motor 26. Further, instead of superimposing or blending, the original control signals including torque, current and voltage may be replaced altogether by the warning signal values.

The torque generation by the motor provides a tactile and/or acoustic feedback to the driver because the modified commands change the assist torque provided and/or the sound generated by the motor 26.

The technical solutions described herein thus facilitate alerting the driver using the motor control loop in an EPS system under fault conditions, as determined through the diagnostic and prognostics monitoring. The technical solutions described herein facilitate using control signals that one or more components of the EPS are using create assist torque to create the driver warning feedback. The technical solutions described herein facilitates generating acoustic and tactile driver feedback warning. Further, the technical solutions facilitate varying the type and amount of feedback over time. The technical solutions described herein thus improve typical driver feedback systems that use passive feedback to the user by instead facilitating providing an active feedback to the driver using the electric actuator of the EPS.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
    a motor control system that sends a command to a motor;
    a fault monitoring system that sets a fault indication flag by monitoring one or more components of the steering system;
    a driver warning feedback system that generates a warning injection signal in response to the fault indication flag being set;
    the motor control system further configured to generate a driver feedback by modifying the command to the motor using the warning injection signal, and sending the modified command to the motor; and a failure monitoring and arbitration module that determines a type of the driver feedback based on the fault indication flag, wherein the type of the driver feedback indicates at least one of a haptic driver feedback and an acoustic driver feedback.

2. The steering system of claim 1, wherein the command that is modified is a torque command.

3. The steering system of claim 1, wherein the command that is modified is a current command.

4. The steering system of claim 1, wherein the command that is modified is a voltage command.

5. The steering system of claim 1, wherein the driver warning feedback system further comprises a fault duration module that monitors a duration of the fault indication being set, wherein the warning injection signal is determined based on the duration.

6. The steering system of claim 1, further comprising an injection signal calculation module that computes the warning injection signal based on the type of the driver feedback to be provided, the computation including determining at least a frequency, and an amplitude of the warning injection signal.

7. The steering system of claim 6, wherein the injection signal calculation module that determines at least a phase of the warning injection signal based on one or more control signals.

8. A method for providing driver warning feedback using a motor control loop in a steering system, the method comprising:
generating a command to be sent to a motor for generating torque;
receiving an indication flag that is indicative of a fault in one or more components of the steering system;
generating a warning injection signal based on the fault indication flag being set;
generating a driver feedback by modifying the command with the warning injection signal, and sending the modified command to the motor; and
determining, by a failure monitoring and arbitration module, a type of the driver feedback based on the fault indication flag, wherein the type of the driver feedback indicates at least one of a haptic driver feedback and an acoustic driver feedback.

9. The method of claim 8, wherein the command that is modified is a torque command.

10. The method of claim 8, wherein the command that is modified is a current command.

11. The method of claim 8, wherein the command that is modified is a voltage command.

12. The method of claim 8, wherein the command that is modified is at least one of a torque command, a current command, and a voltage command, and a result of an error simulation in a sensor signal of the steering system.

13. The method of claim 8, further comprising, monitoring, by a fault duration module, a duration of the fault indication being set, wherein the warning injection signal is determined based on the duration.

14. The method of claim 8, further comprising:
computing, by an injection signal calculation module, the warning injection signal based on the type of the driver feedback to be provided, the computation including determining at least a frequency and an amplitude of the warning injection signal.

15. The method of claim 8, further comprising computing, by an injection signal calculation module, the warning injection signal based on the type of the driver feedback to be provided, the computation including determining at least a phase of the warning injection signal based on one or more control signals.

16. A driver warning feedback system comprising:
a failure monitoring and arbitration module configured to:
monitor a fault indication flag that is indicative of a fault in operation of one or more components of a steering system; and
determine to provide at least one of a haptic driver feedback and an acoustic driver feedback in response to the fault indication flag being set; and
an injection signal calculation module configured to:
compute a warning injection signal based on the at least one of the haptic driver feedback and the acoustic driver feedback to be provided, the computation including determining at least a frequency and an amplitude of the warning injection signal; and
send the warning injection signal to a motor control system of the steering system for using the warning injection signal as a command sent to a motor of the steering system to generate the driver feedback.

17. The driver warning feedback system of claim 16, wherein the warning injection signal is superimposed on at least one of a torque command, a current command, a voltage command, and a sensor signal.

18. The driver warning feedback system of claim 16, wherein the failure monitoring and arbitration module is further configured to determine a phase of the warning injection signal based on one or more control signals.

19. The driver warning feedback system of claim 16, further comprising:
a fault duration module configured to:
monitor a duration of the fault indication flag being set; and
modify the warning injection signal in response to the duration exceeding a threshold duration.

20. The driver warning feedback system of claim 19, wherein the threshold duration is a number of ignition cycles for which the fault indication flag is set.

* * * * *